(12) United States Patent
Hamano et al.

(10) Patent No.: US 7,971,239 B2
(45) Date of Patent: Jun. 28, 2011

(54) DEVICE CONTROL APPARATUS

(75) Inventors: Atsushi Hamano, Tokyo (JP); Mariko Kitajima, Tokyo (JP); Jun Saito, Kanagawa (JP); Hiroyuki Obinata, Kanagawa (JP)

(73) Assignee: Sony Computer Entertainment Inc., Tokyo (JP)

( * ) Notice: Subject to any disclaimer, the term of this patent is extended or adjusted under 35 U.S.C. 154(b) by 985 days.

(21) Appl. No.: 11/482,516

(22) Filed: Jul. 6, 2006

(65) Prior Publication Data
US 2007/0011730 A1    Jan. 11, 2007

(30) Foreign Application Priority Data

Jul. 7, 2005    (JP) ................................ 2005-198526

(51) Int. Cl.
| G06F 15/16 | (2006.01) |
| G06F 17/30 | (2006.01) |
| H04L 29/06 | (2006.01) |
| G06F 11/30 | (2006.01) |
| G06F 7/04 | (2006.01) |

(52) U.S. Cl. .............. 726/9; 726/34; 713/189; 717/168; 717/169; 717/170; 717/171; 717/172; 717/173

(58) Field of Classification Search .................. 713/189; 726/1–21, 26–33, 34; 717/168–173
See application file for complete search history.

(56) References Cited

U.S. PATENT DOCUMENTS

| 6,141,756 A * | 10/2000 | Bright et al. ..................... 726/22 |
| 2002/0015494 A1 * | 2/2002 | Nagai et al. .................... 380/201 |
| 2003/0046563 A1 * | 3/2003 | Ma et al. ........................ 713/190 |
| 2003/0056107 A1 * | 3/2003 | Cammack et al. ............ 713/189 |
| 2005/0108560 A1 | 5/2005 | Han et al. |
| 2005/0190916 A1 * | 9/2005 | Sedacca ........................ 380/239 |

FOREIGN PATENT DOCUMENTS

| JP | 7-225550 | 8/1995 |
| JP | 10-228374 | 8/1998 |
| JP | 11-39261 | 2/1999 |
| JP | 11-282667 | 10/1999 |
| JP | 2003-330365 | 11/2003 |

OTHER PUBLICATIONS

Notice of Rejection dated Nov. 10, 2009, from the corresponding Japanese Application.
Shin Hitotsumatsu, et al. "Study of Data Protection and Encryption" Nikkei Inc., pp. 89-101, Jul. 29, 1983.
Chinese Office Action dated Aug. 21, 2009, from the corresponding Japanese Application.

* cited by examiner

Primary Examiner — Michael J Simitoski
(74) Attorney, Agent, or Firm — Katten Muchin Rosenman LLP

(57) ABSTRACT

A device control apparatus, comprising a processor for storing first key information, a memory section for storing encrypted second key information which is obtained by encrypting second key information such that the second key information is able to be restored through decryption using the first key information, and an interface section for carrying out authentication using the second key information when an access instruction requiring access to a device is given by the processor, and for controlling the access to the device based on the access instruction when the authentication is established.

6 Claims, 3 Drawing Sheets

DEVICE CONTROL APPARATUS

CROSS-REFERENCE TO RELATED APPLICATIONS

The application number JP2005-198526, from which priority is claimed, is incorporated herein by reference.

BACKGROUND OF THE INVENTION

1. Field of the Invention

The present invention relates to a device control apparatus, such as a computer system, a consumer gaming machine, and so forth, which is connected to at least one device.

2. Description of the Related Art

Generally, a computer system, a consumer gaming machine, and so forth, is connected to a plurality of devices, including an input device, such as a mouse, a keyboard, a game controller, and so forth, and an external disc device, such as a DVD drive, and so forth.

In recent years, a problematic technique for eavesdrop for cheating a signal relating to an access made by the CPU of a computer system with respect to such a device becomes a serious issue.

For example, in data encryption, which is carried out by a CPU by reading plain data from a memory, processing the plain data, and storing the processed data into the memory, there is a possibility that the plain data before encryption may be stolen by reading out the data from signal lines through which the CPU read out the data from the memory device.

In order to cope with the above situation, there is proposed a technique for encrypting data being exchanged between the device and the CPU. In such a technique, a different encryption key is assigned to each device. Also, in order to avoid a situation in which encryption in all apparatuses would becomes invalidated should an encryption key be stolen, for example, a different encryption key may be used for each apparatus.

However, supposing that a different encryption key is used for each apparatus, the number of encryption keys which would be necessary in communication with the devices to access would be required to be issued for each apparatus and set in the CPU. This results in increased burden in manufacturing, and therefore, manufacturing efficiency cannot be improved.

It should be noted that a technique for eliminating the need to assign an individual encryption key to software to be distributed is disclosed in Japanese Patent Laid-open Publication No. Hei 11-282667.

SUMMARY OF THE INVENTION

The present invention has been conceived in view of the above described situation. One of the objects of the present invention is to provide a device control apparatus for encrypting data to be exchanged with respect to a device, which needs only a reduced number of encryption keys which should be issued for each apparatus.

According to one aspect of the present invention, there is provided a device control apparatus to be connected to at least one device, comprising a processor for storing first key information; a memory section for storing encrypted second key information which is obtained by encrypting second key information such that the second key information is able to be restored through decryption using the first key information; and an interface section for carrying out authentication using the second key information when an access instruction requiring access to a device is given by the processor, and for controlling the access to the device based on the access instruction when the authentication is established.

DESCRIPTION OF THE PREFERRED EMBODIMENTS

An embodiment of the present invention will be described while referring to the accompanied drawings.

Figure 1:
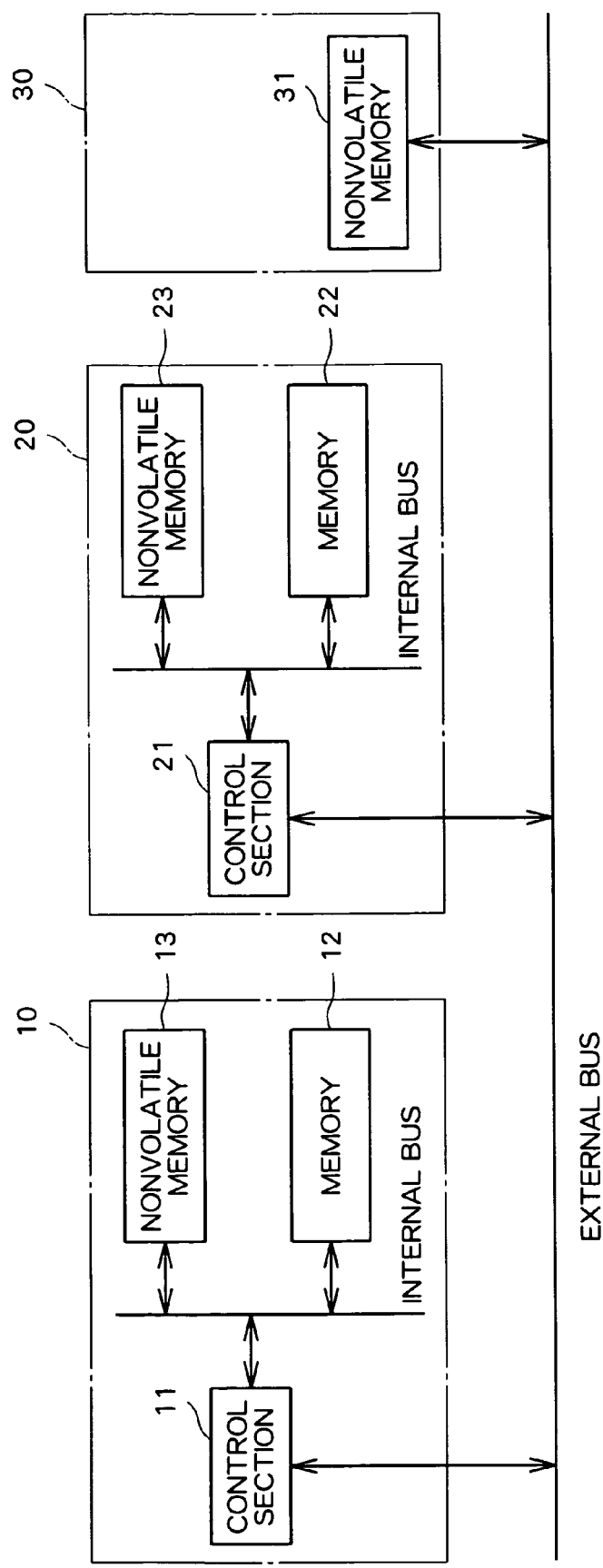
FIG. 1 is a structural block diagram showing a device control apparatus according to an embodiment of the present invention.

As shown in FIG. 1, a device control apparatus according to an embodiment of the present invention is constructed comprising a CPU 10, a device control unit 20, and a memory unit 30, which are mutually connected via an external bus.

Here, the CPU 10 includes a control section 11, a memory 12, and a nonvolatile memory 13, and the device control unit 20 includes a control section 21, a memory 22, and a nonvolatile memory 23. The memory unit 30 is formed including a nonvolatile memory 31.

The CPU 10 corresponds to a processor of the present invention. The control section 11 of the CPU 10 may be a CPU core (an individual processing unit) and so forth, and operates according to a program stored in the memory 12 or the nonvolatile memory 13. In this embodiment, the control section 11 carries out processing for accessing a device.

The memory 12 may be, for example, a RAM (Random Access Memory), and connected to the control section 11 via a processor internal bus. The memory 12 operates as a work memory of the control section 11.

The nonvolatile memory 13 may be an NVRAM (Nonvolatile Random Access Memory), an EEPROM (Electronically Erasable and Programmable Read Only Memory), or the like, and connected to the control section 11 via a processor internal bus. The nonvolatile memory 13 holds a program to be carried out by the control section 11 and a processor key (first key information) MK which is created at the time of manufacture of CPU 10. A processor key MK may be set for every device or unit.

The device control unit 20 corresponds to an interface section of the present invention and is connected to a device to be controlled. The control section 21 of the device control unit 20 may be a CPU core, and operates according to a program held in the memory 22 or the nonvolatile memory 23. In this embodiment, the control section 21 carries out processing for accessing a device.

The control section 21 controls a device connected, according to an access instruction for accessing the device, which is sent from the CPU 10. In this embodiment, the control section 21 receives a variety of encrypted data including instruction data or the like concerning control of a device, and decrypts the data or the like using a device key K, to carry out processing such as controlling the device. The device to be controlled here may be a device connected via a network.

The memory 22 may be a RAM and is connected to the control section 21 via a processor internal bus. The memory 22 operates as a work memory of the control section 21. The nonvolatile memory 23 may be an NVRAM, an EEPROM, or the like and connected to the control section 21 via a processor internal bus. This nonvolatile memory 23 holds a program to be carried out by the control section 21 and a device key (second key information) K created at the time of manufacture.

The nonvolatile memory 31 of the memory unit 30 may be an NVRAM, an EEPROM, or the like, and holds a program to be carried out by the control section 11 of the CPU 10 and information on a variety of parameters. In this embodiment, the nonvolatile memory 31 holds a loader program for reading a program, a loader encryption key (third key information) EK which is set in advance relative to the loader program, a device key K, and a program P for accessing a device.

Here, the loader program "loader" and the loader encryption key information EK are linked to each other, and encrypted using the processor key MK. In the following, this type of linkage is expressed as (loader||EK), and the fact that the linked "loader" and EK are encrypted using the processor key MK is expressed as E(MK,(loader||EK)).

An cryptography algorithm used here is a symmetric-key encryption. The information of E(MK, (loader||EK)) can be decrypted using the processor key MK.

Further, the device key K and the program P for accessing a device are held in the nonvolatile memory 31, in a condition of being subjected to symmetric-key encryption using the loader encryption key EK. That is, the device key K and the program P are held as E(EK,K) and E(EK, P), respectively, in the nonvolatile memory 31. These can be decrypted using the loader encryption key EK.

Here, a different loader encryption key EK is used for every predetermined number of apparatus manufactured in this embodiment. Specifically, supposing that the predetermined number of apparatuses manufactured is defined as "one", a different loader encryption key is assigned to every apparatus manufactured, and supposing the predetermined number of apparatuses manufactured is defined as "one unit", a different loader encryption key is assigned to every unit of apparatuses manufactured. Also, device key K may be changed for every predetermined number of apparatuses manufactured.

It should be noted that the processor key MK may also be changed for every predetermined number of apparatuses manufactured in this embodiment.

Figure 2:
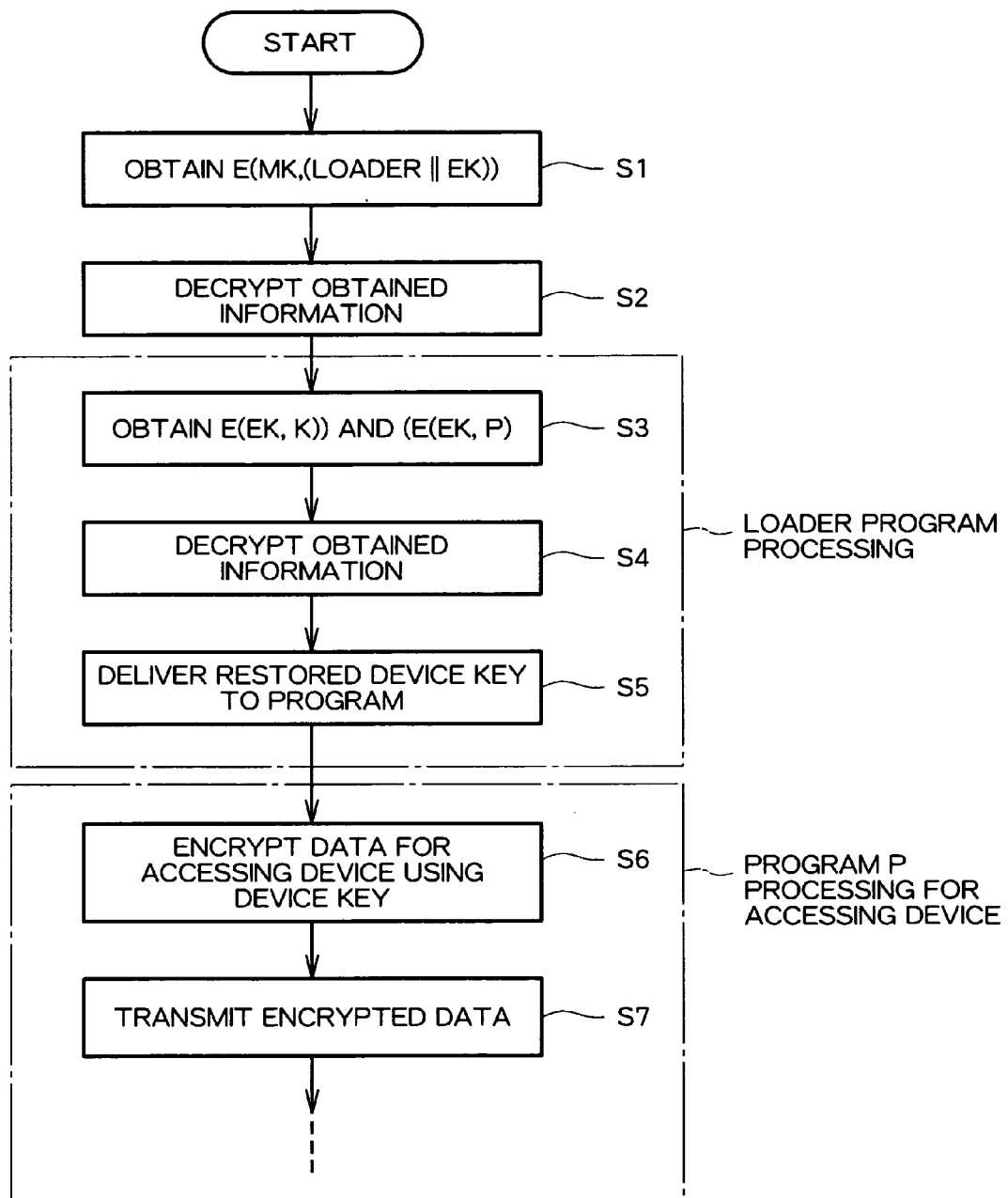
FIG. 2 is a flowchart showing an example of an operation of the device control apparatus according to an embodiment of the present invention.

Here, an operation of the control section 11 will be described. The control section 11 reads a program held in the nonvolatile memory 31 and stores the program in the memory 12 before carrying out relevant processing. A specific example of the processing will be described while referring to FIG. 2.

Initially, the control section 11 obtains a loader program and a loader encryption key, namely, (E(MK, (loader||EK)), from the nonvolatile memory 31 of the memory unit 30 (S1).

Then, the control section 11 decrypts the obtained information using a processor key MK, and stores the restored loader program and loader encryption key in the memory 12 (S2). The control section 11 begins processing of the loader program to specifically obtain an encrypted device key (E(EK,K)) and an encrypted program (E(EK,P)) from the nonvolatile memory 31 (S3). The control section 11 then decrypts the encrypted device key (E(EK,K)) and the encrypted program (E(EK,P)), using a loader encryption key EK stored in the memory 12 (S4).

Then, the control section 11 begins execution of the restored program P. In the above, the control section 11 delivers the restored device key K to the program P (S5). The delivery may be achieved by, for example, copying the device key K into a memory space which the program P can access. Alternatively, the delivery may be carried out by obtaining the device key K in response to a request from the program P.

When access to a device is attempted in the processing of the program P, the control section 11 encrypts a variety of data D, such as instruction data for controlling the device, data to be output to the device, or the like, using the device key K (S6), and outputs the encrypted data E(K,D) to the device control unit 20 (S7).

The control section 21 of the device control unit 20 decrypts the encrypted data using the device key K stored in the nonvolatile memory 23 to read out the data, as described above, and controls the device using the data or outputs the data to the device.

Also, the control section 21 of the device control unit 20 may encrypt the data input from the device, using the device key K, before outputting to the control section 11 of the CPU 10. In this case, the control section 11 decrypts the received encrypted data using the device key K which is restored at the process S4 to obtain the data input from the device.

In this embodiment, at least either one of the loader encryption key EK and the device key K should be set as an encryption key, and storage of both of these encryption keys in the CPU 10 is unnecessary. That is, setting up of the CPU 10 or the processor for every predetermined unit, such as every apparatus or every predetermined unit of apparatuses, is unnecessary, although of course, a processor key MK may be set for every device or unit, as described above.

It should be noted that, when a different device key K1, K2 and so forth is assigned to each connected device or a single device uses a plurality of device keys in this embodiment, a device key Ki of a corresponding device may be stored in the nonvolatile memory 23 of the device control unit 20 corresponding to the device, and the information E(EK,K1), E(EK, K2), and so forth which are obtained by encrypting each device key Ki using the loader encryption key EK may be stored in the nonvolatile memory 31 of the memory unit 30, so that the CPU 10 obtains the information and delivers to the program P.

In the above, the respective device keys Ki may be linked to one another before being encrypted, rather than the respective device keys Ki being individually encrypted. That is, the group of device keys may be encrypted as E(EK,K1|| . . . ||Kn).

In this case, the CPU 10 obtains the information of the linked keys of the device key group and obtains the respective device keys Ki.

Further, in this embodiment, authentication of the encrypted information may be carried out by adding a digital signature. That is, in the example in which authentication is carried out, a loader public key EPK for use in authentication and a corresponding loader secret key ESK are issued. Then, the information E (EK,K1|| . . . ||Kn), which is obtained by, for example, linking, and encrypting using the loader encryption key EK, the respective keys of the device key group, and the information E(EK,P), which is obtained by encrypting the program P, are digitally signed using a loader secret key ESK. In the following, the above-described digitally signed information is denoted as Sig(ESK,E(EK,K1|| . . . ||Kn)) and Sig (ESK,E(EK,P)), respectively.

Also, the loader public key EPK is linked to the loader program "loader" and the loader encryption key EK, and then encrypted using the processor key MK to form E(MK, (loader||EK||EPK)).

The information obtained by linking the loader program, the loader encryption key, and the loader public key, namely, E(MK,(loader||EK||EPK)), the information concerning the device key group, namely, Sig(ESK,E(EK,K1|| . . . ||Kn)), and the program P, namely, Sig(ESK,E(EK,P)), are all stored in the nonvolatile memory 31 of the memory unit 30.

Figure 3:
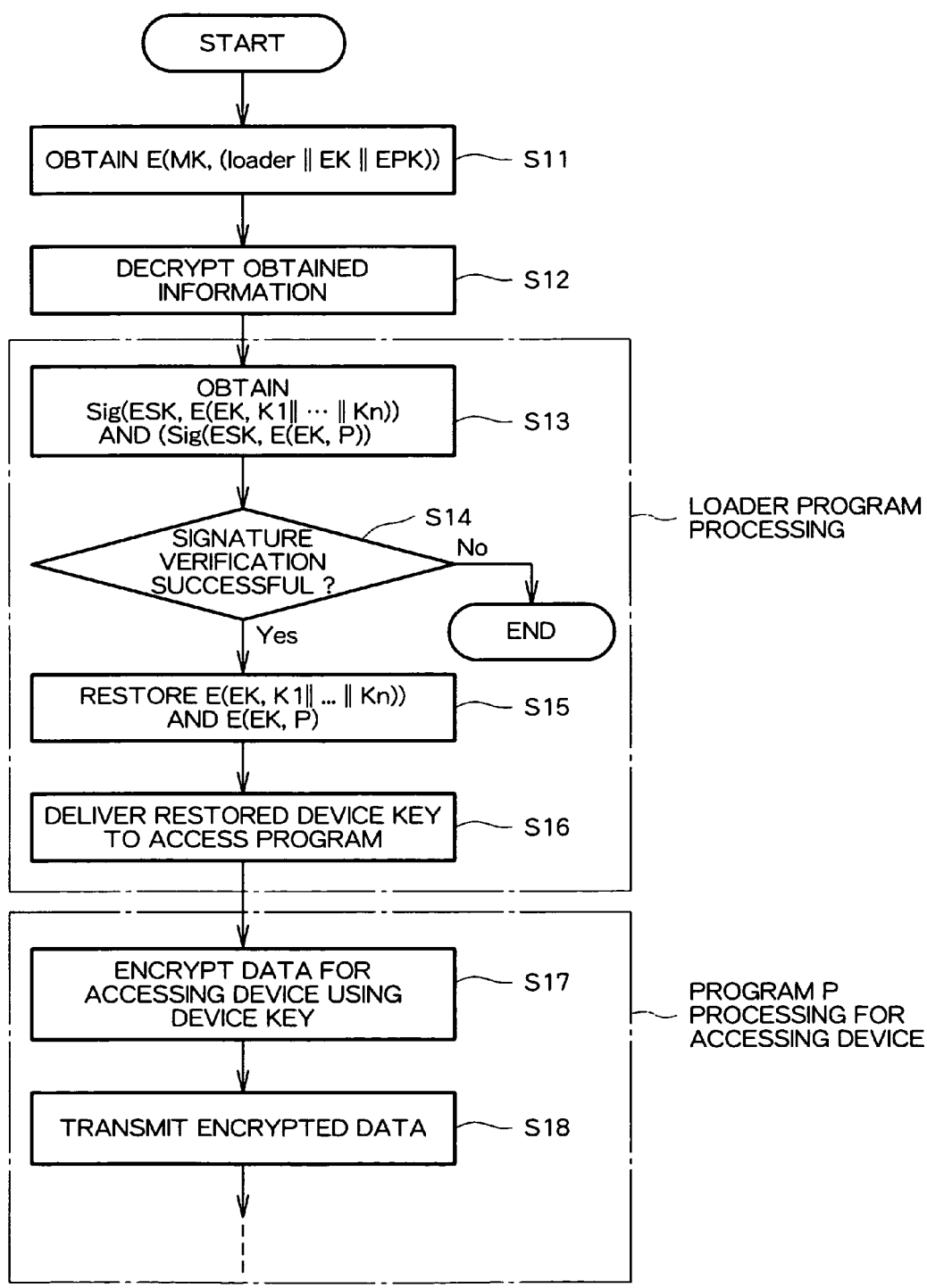
FIG. 3 is a flowchart showing another example of an operation of the device control apparatus according to an embodiment of the present invention.

As described above, the control section 11 carries out authentication by following the operation shown in FIG. 3, for example. Initially, the control section 11 obtains the loader program, the loader encryption key, and the loader public key, namely, E(MK,(loader‖EK‖EPK)), from the nonvolatile memory 31 of the memory unit 30 (S11).

Then, the control section 11 decrypts the obtained information using the processor key MK (S12), and stores the restored loader program "loader", loader encryption key EK, and loader public key EPK in the memory 12. The control section 11 begins processing of the loader program to obtain the encrypted and digitally signed device key (Sig(ESK,E (EK,K1‖ . . . ‖Kn))) and the encrypted and digitally signed program (Sig(ESK,E(EK,P))) from the nonvolatile memory 31 (S13).

The control section 11 verifies the digitally signed information using the loader public key EPK (S14). When the verification fails, the processing is terminated.

When the verification completes successfully, on the other hand, the encrypted information is decrypted using the loader encryption key EK stored in the memory 12 (S15). Then, the control section 11 begins execution of the restored program P. In the above, the control section 11 delivers the restored device key groups to the program P (S16).

When access to a device is attempted in the processing of the program P, the control section 11 encrypts the variety of data D including the instruction data relevant to control of the device, data to be output to the device, and so forth, using a device key Ki corresponding to the device to access (S17), and then outputs the encrypted data E(Ki,D) to the corresponding device control unit 20 (S18).

As described above, the control section 21 of the device control unit 20 decrypts the encrypted data using the device key Ki stored in the nonvolatile memory 23 to read out the data, and controls the device using the data or outputs the data to the device.

Also, in this case, the control section 21 of the device control unit 20 encrypts the data input from the device, using the device key Ki before outputting to the control section 11 of the CPU 10. In this case, the control section 11 decrypts the received encrypted data using a corresponding device key Ki to obtain the data input from the device.

It should be noted that, although only one type of program P for accessing a device is referred to here, a case in which two or more types of programs P for accessing a device are available is also applicable. In this case, the data E(EK,P1), E(EK, P2), and so forth, which is obtained by encrypting the respective programs P1, P2, and so forth may be stored in the nonvolatile memory 31 of the memory unit 30, and the control section 11 may obtain and decrypt a program instructed by a user, for example.

Also, accessible devices can be limited for every program. That is, each program may be stored in the nonvolatile memory 31 so as to be associated with information (capability information) for specifying a usable device key, and the control section 11 refers to the capability information associated with the program to be executed and delivers only a device key which is determined as usable.

Here, the capability information may be, for example, a numeric value which is expressed using the number of bits which is larger than the maximum number of the device keys which are allowed to be set. When a numeric value is used, a device key Ki is made associated with each bit. For example, it may be arranged such that the i-th bit indicates whether or not the i-th device key Ki is usable, and for every program, a bit corresponding to a usable device key may be set as "one" while a bit corresponding to a not-usable device key may be set as "zero". Supposing that the number of device keys which are allowed to be set is 100, for example, a bit array comprising 128 bits may be used.

The capability information determined as described above is stored in the nonvolatile memory 31 of the memory unit 30 so as to be associated with a corresponding program. For example, as a method for associating the program Pj with the capability information Cj, the program Pj and the capability information Cj may be linked to each other and then encrypted together to form Sig(ESK,E(EK, (Pj‖Cj))) which is then stored in the nonvolatile memory 31 of the memory unit 30. Alternatively, for example, the capability information may be held in the header section (ELF header, or the like) of the program P.

Further, a processor public key MPK which is issued in advance may be stored in the nonvolatile memory 13 of the CPU 10, and the data which is obtained by encrypting the loader program and/or the loader encryption key may be digitally signed using a processor secret key MSK corresponding to the processor public key MPK.

In this case, the data Sig(MSK,E(MK, (loader‖EK‖EPK))), instead of E(MK, (loader‖EK‖EPK)), which is digitally signed using the processor secret key MSK is stored in the nonvolatile memory 31 of the memory unit 30.

After receiving the digitally signed data, the control section 11 carries out authentication of the signature, using the processor public key MPK. When authentication is not established, the subsequent processing is suspended. When authentication is established, on the other hand, the processing is continued to restore the loader program and the loader encryption key through decryption and to begin the loader program.

It should be noted that a case in which two or more loader encryption keys and loader public keys are used is also applicable to the above description. In this case, for example, the device key group is encrypted using the first loader encryption key EK1 to form E(EK1,K1‖ . . . ‖Kn), and the program (including capability information, if any) is encrypted using the second loader encryption key EK2 to form E(EK2,P).

Further, the encrypted information is digitally signed, upon necessity, using the first and second loader secret keys ESK1, ESK2 which correspond to the first and second loader public keys, respectively, to form Sig(ESK1,E(EK1,K1‖ . . . ‖Kn)) and Sig(ESK2,E(EK2,P)). The Sig(ESK1,E(EK1,K1‖ . . . ‖Kn)) and the Sig(ESK2,E(EK2,P)) are stored in the nonvolatile memory 31 of the memory unit 30.

Further, a plurality of loader encryption keys and loader public keys are linked to one another, and then encrypted together with the loader program, using the processor key MK. Still further, the encrypted information is digitally signed, upon necessity, using the processor secret key MSK to form Sig(MSK,E(MK,(loader‖EK1‖EPK1‖EK2‖EPK2))), which is then stored in the nonvolatile memory 31 of the memory unit 30.

The control section 11 obtains the information, and authenticates the signature. When the authentication is established, the information is decrypted using the corresponding key, and the above described processing is carried out.

It should be noted that the device as described above may be, for example, other processors if the apparatus has beside CPU 10. In this case, the data such as instruction data concerning control of a device, or the like, may be a communication message addressing the other processors.

As described above, in this embodiment, only either one of the loader encryption key EK and the device key K should be individually set for each apparatus or each unit as an encryption key. In addition, storage of both of these encryption keys in the CPU 10 is unnecessary. That is, individual setting up of the CPU 10, or the processor, for every predetermined unit, such as for every device or predetermined unit, is unnecessary. This can improve productivity.

Further, a processor key or the like can be referred to as a plain only within the unit. This can reduce the possibility of the information being leaked, as the information is not referred to from the outside.

While the present invention is described in terms of preferred or exemplary embodiments, it is not limited thereto.

What is claimed is:

1. A device control apparatus connected to a plurality of devices, comprising:
    a processor with first key information embedded therein; and
    a memory section for storing encrypted second key information for each of the plurality of devices which is obtained by encrypting second key information for each of the plurality of devices using third key information, encrypted third key information which is obtained by encrypting the third key information using the first key information, and a plurality of access programs for accessing the plurality of devices, which are encrypted using the third key information, each of the plurality of access programs is stored in the memory section associated with information specifying a usable second key information, wherein
    the processor decrypts the encrypted third key information using the embedded first key information to store the decrypted third key information in a memory embedded in the processor, obtains the usable second key information and the associated access program through decryption using the decrypted third key information, encrypts an access instruction requiring access to the device using the usable second key information based on the associated access program, and outputs the encrypted access instruction.

2. The device control apparatus according to claim 1, wherein the processor operates according to a loader program stored in the memory section, and loads the access program based on the loader program,
    the loader program is encrypted together with third key information, using the first key information, and
    the processor obtains the loader program through decryption using the first key information.

3. A device control apparatus connected to a plurality of devices, comprising:
    a processor with first key information embedded therein; and
    a memory section for storing information obtained by encrypting third key information and public key information using the first key information, and also information obtained by encrypting second key information for each of the plurality of devices and a plurality of access programs for accessing the plurality of devices using the third key information, and by digitally signing the encrypted second key information and the encrypted access programs using secret key information corresponding to the public key information, each of the plurality of access programs is stored in the memory section associated with information specifying a usable second key information, wherein
    the processor decrypts the encrypted third key information and the encrypted public key information using the embedded first key information to store the decrypted third key information and the decrypted public key information in a memory embedded in the processor, verifies signatures of the encrypted second key information and the encrypted access program using the decrypted public key information, obtains the usable second key information and the associated access program through decryption using the decrypted third key information when the verification is completed successfully, encrypts an access instruction requiring access to the device using the usable second key information based on the associated access program, and outputs the encrypted access instruction.

4. A device control method, while using an apparatus being connected to a plurality of devices and comprising a processor with first key information embedded therein, and a memory section for storing encrypted second key information for each of the plurality of devices which is obtained by encrypting second key information for each of the plurality of devices using third key information, encrypted third key information which is obtained by encrypting the third key information using the first key information, and a plurality of access programs for accessing the plurality of devices, which are encrypted using the third key information, each of the plurality of access programs is stored in the memory section associated with information specifying a usable second key information, the method comprising the steps of:
    decrypting the encrypted third key information using the embedded first key information to store the decrypted third key information in a memory embedded in the processor;
    obtaining the usable second key information and the associated access program through decryption using the decrypted third key information;
    encrypting an access instruction requiring access to the device using the usable second key information based on the associated access program; and
    outputting the encrypted access instruction.

5. The device control method according to claim 4, wherein the processor operates according to a loader program stored in the memory section, and loads the access program based on the loader program, the loader program is encrypted together with third key information, using the first key information; and further comprising the step of obtaining by the processor the loader program through decryption using the first key information.

6. A device control method, while using an apparatus being connected to a plurality of devices, and comprising a processor with first key information embedded therein; and a memory section for storing information obtained by encrypting third key information and public key information using the first key information, and also information obtained by encrypting second key information for each of the plurality of devices and a plurality of access programs for accessing the plurality of devices using the third key information, and by digitally signing the encrypted second key information and the encrypted access programs using secret key information corresponding to the public key information, each of the plurality of access programs is stored in the memory section associated with information specifying a usable second key information, the method comprising the steps of:
    decrypting the encrypted third key information and the encrypted public key information using the embedded first key information to store the decrypted third key information and the decrypted public key information in a memory embedded in the processor, verifying signatures of the encrypted second key information and the encrypted access program using the decrypted public key information, obtaining the usable second key information and the associated access program through decryption using the decrypted third key information when the verification is completed successfully, encrypting an access instruction requiring access to the device using the usable second key information based on the associated access program, and outputting the encrypted access instruction.

* * * * *